United States Patent
Bronnenberg

(10) Patent No.: US 6,925,604 B1
(45) Date of Patent: Aug. 2, 2005

(54) SOFTWARE CONTROLLED IMAGING SYSTEM WITH AN APPLICATION MODULE INTERCONNECTED TO A USER INTERFACE CONTROLLER MODULE IN A DATA DRIVEN ORGANIZATION

(75) Inventor: Wilhelmus J. H. J. Bronnenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 906 days.

(21) Appl. No.: 09/296,724

(22) Filed: Apr. 22, 1999

(30) Foreign Application Priority Data

Apr. 23, 1998 (EP) .............................................. 98201324

(51) Int. Cl.⁷ ................................................. G09G 5/00
(52) U.S. Cl. ........................ 715/745; 715/746; 715/747; 715/825
(58) Field of Search ................................. 395/155, 700, 395/200.03, 200.02, 822; 345/327, 339, 335, 352, 326; 348/12, 13; 703/328, 313, 315, 320; 715/744, 745, 746, 747, 825

(56) References Cited

U.S. PATENT DOCUMENTS 5,327,529 A * 7/1994 Fults et al. .................. 395/155
5,499,341 A * 3/1996 Wilson et al. .......... 395/200.03
5,982,362 A * 11/1999 Crater et al. ................. 345/327

* cited by examiner

*Primary Examiner*—Ba Huynh

(57) ABSTRACT

A software controlled imaging system wherein an application module is interconnected to a user interface controller module and which also includes user interaction elements and an imaging subsystem. The user interface controller module is arranged to generate a pull request to the application module which in turn is designed, in a demand driven organization, to output one or more User Interface elements to the user interface controller module. The user interface controller module decides which GUI elements will be rendered and when and how they will be structured.

6 Claims, 5 Drawing Sheets

"PHILIPS TV 78/W" (root) menu:

MENU ("INSTALL PRESET", R-I1, '10')

MENU (" SET DATE/TIME", R-I2, '20')

MENU (" SET LANGUAGE", R-I3, '30')

MENU (" MORE OPTIONS", R-I4, '40')

"INSTALL PRESET" menu:
    NUMBER ("PRESET NUMBER", L1-I1, "12",2,2)

TEXT ("PROG.NAME", L1-I2, "ZDF", 4)

NUMBER ("FREQUENCY", L1-I3, "0419",4,3) )

BUTTON ("STEREO TO MONO", L1-I4, )

RANGE ("- VOLUME +", L1-14, ,

MENU ("PHILIPS TV 78/W", L1-I6, '1F')

SOFTWARE CONTROLLED IMAGING SYSTEM WITH AN APPLICATION MODULE INTERCONNECTED TO A USER INTERFACE CONTROLLER MODULE IN A DATA DRIVEN ORGANIZATION

BACKGROUND OF THE INVENTION

The invention relates to a software controlled imaging system. It has been proposed to allow customers to use a variety of imaging subsystems with the same software program the application module always remaining unmodified. If the software would remain indeed the pushing force, the application module would be capable to deal with all possible types of imaging subsystems, which is expensive to realize. In consequence, there is need for a system with improved flexibility.

SUMMARY TO THE INVENTION

In consequence, amongst other things, it is an object of the present invention to expand a system as recited on the level of its internal interactivity for so attaining a higher degree of flexibility. Now therefore, according to one of its aspects the invention is characterized in that a user interface controller module is arranged for generating a pull request to an application module in a demand driven organization. The application module, in turn, outputs to a user interface controller module, one or more User Interface elements as indicated in the request, so that the user interface controller module is operative for deciding which GUI elements will be rendered and when and how they will be structured. Further advantageous aspects of the invention are recited below.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DETAILED DESCRIPTION OF PREFERRED EMBODIMENTS

Figure 1:
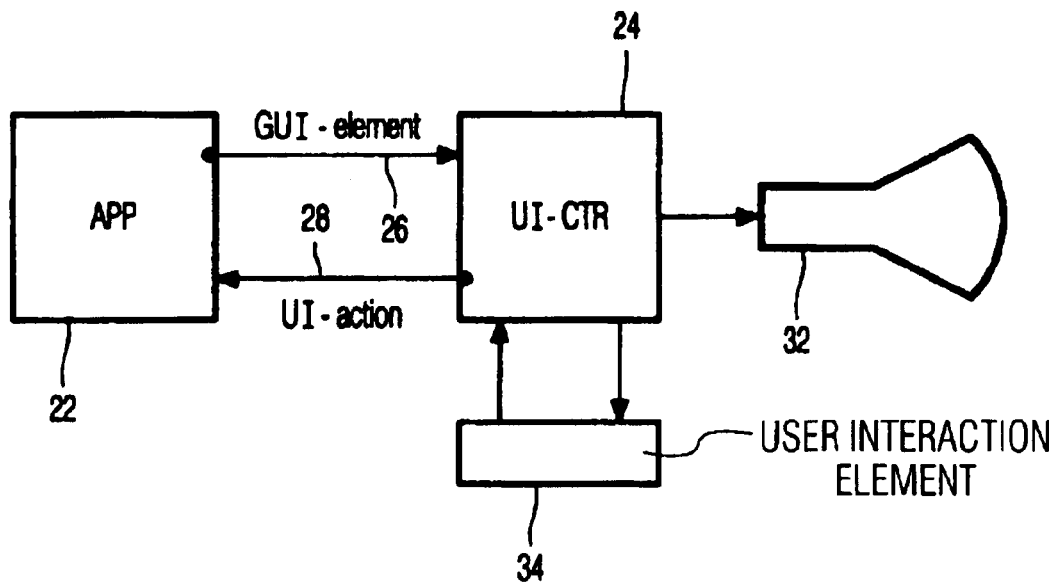
FIG. 1, conventional software controlled imaging.

FIG. 1 illustrates conventional software controlled imaging, that may be implemented in a consumer electronics apparatus such as a television set. An application program is running on application module 22; this module includes the necessary data storage and data processing facilities. A visual image is presented to a user on imaging subsystem 32, under control of user interface controller module 24. The imaging system may be a Teletext Display, an LCD, or even be based on a PC; in consequence, subsystem 32 could contain those items necessary for generating the screen image from control signals received, such as scan synchronization, character/icon generator, color look-up-table, and other.

Furthermore, user interaction is possible on user interaction element 34 that may have a remote control device, keyboard, mouse, speech and other interactivity facilities. The main drive for amending the displayed image is given spontaneously by the application module on line 26. Such origin has been indicated by a dot, which convention will be maintained hereinafter. Subsequently, the application module may receive a user interface action on line 28. In consequence, the system flexibility and performance are restricted to that of the least capable version of the user interface controller module that has been foreseen. The interconnection lines as shown may realize a messaging system through wires, through software interaction, or otherwise.

Figure 2:
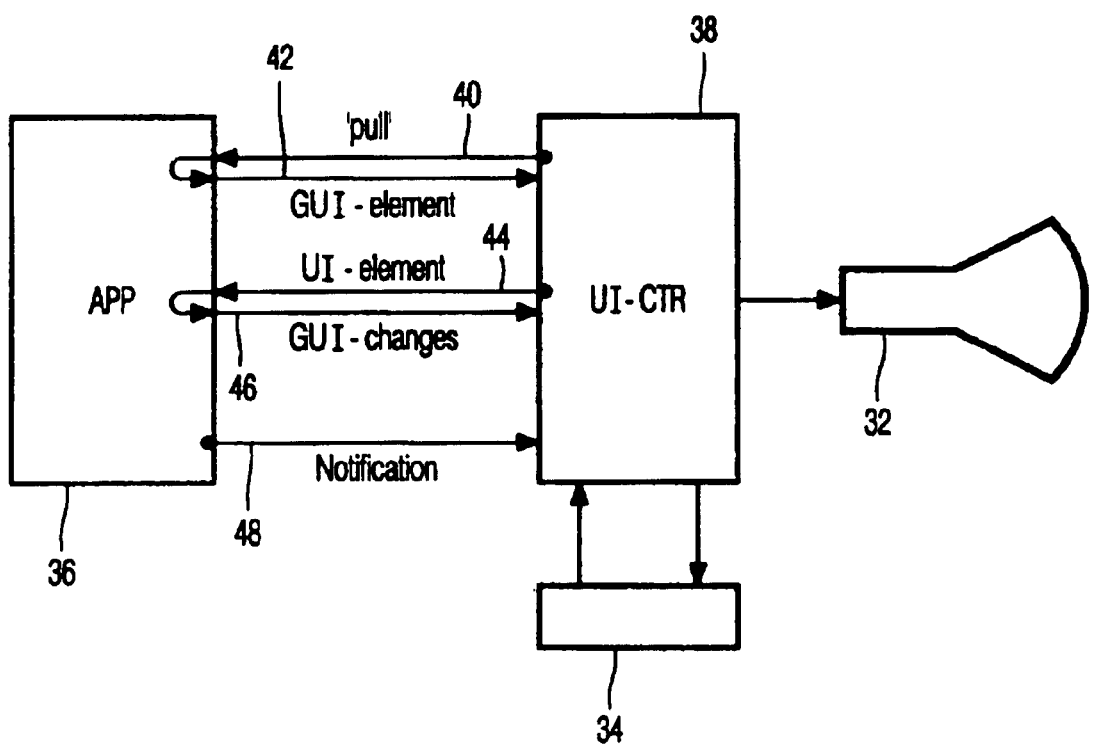
FIG. 2, software controlled imaging of the invention.

FIG. 2 illustrates software controlled imaging according to the invention. Application module 36 largely compares to module 22 in FIG. 1. Also user interface controller module 38 has similar functions as module 24 in FIG. 1. Modules 32, 34 also appear. The interaction pattern between modules 36, 38 has been radically amended with respect to FIG. 1. First, User Interface Controller Module 38 may spontaneously issue a so-called 'pull' request on line 40 to Application Module 36, which has been signaled by the dot discussed before. Secondly, as indicated by the retrocoupling arrow, this results in sending the requested graphical user interface elements from Application Module 36 to User Interface Controller Module 38. Also the arrow convention will be followed hereinafter. In its broadest sense, certain UI-elements may bo non-graphical such as acoustic, but for the remainder of the description such has been ignored.

Subsequent to the pulling, a user interface action may be sent via line 44 from User Interface Controller Module 38 to Application Module 36, which may result in one or more (G)UI element changes that are reported via line 46 back to User Interface Controller Module 38. Also, independent Notifications with respect to (G)UI element changes may be spontaneously forwarded on line 48, without earlier relevant signalization from controller module 38.

The received (G)UI element changes may cause User Interface Controller Module 38 to issue one or more further 'pull' requests via line 40 and to again receive new or updated (G)UI elements via line 42. In consequence, the system is demand driven, and User Interface Controller Module 38 determines which (G)UI elements will be rendered, and when such will be effected and how they will be structured. The User Interface Controller Module 38 decides on the presentation to the user of in particular the information aspects of the presentation, such as by full text, iconizing, menuing and further items of similar levels of complexity. Specific organization thereof, and relevant embodiments will be dealt with hereinafter.

Figures 3, 3A:
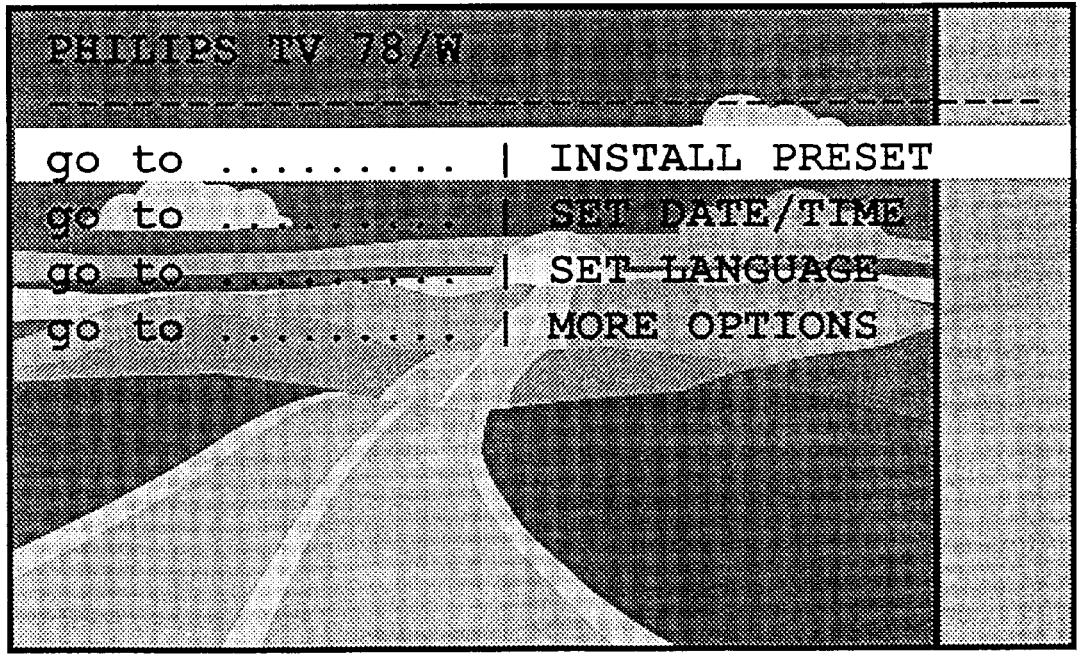
FIGS. 3, 3A–3C, examples of a root menu image.
Figure 3B:
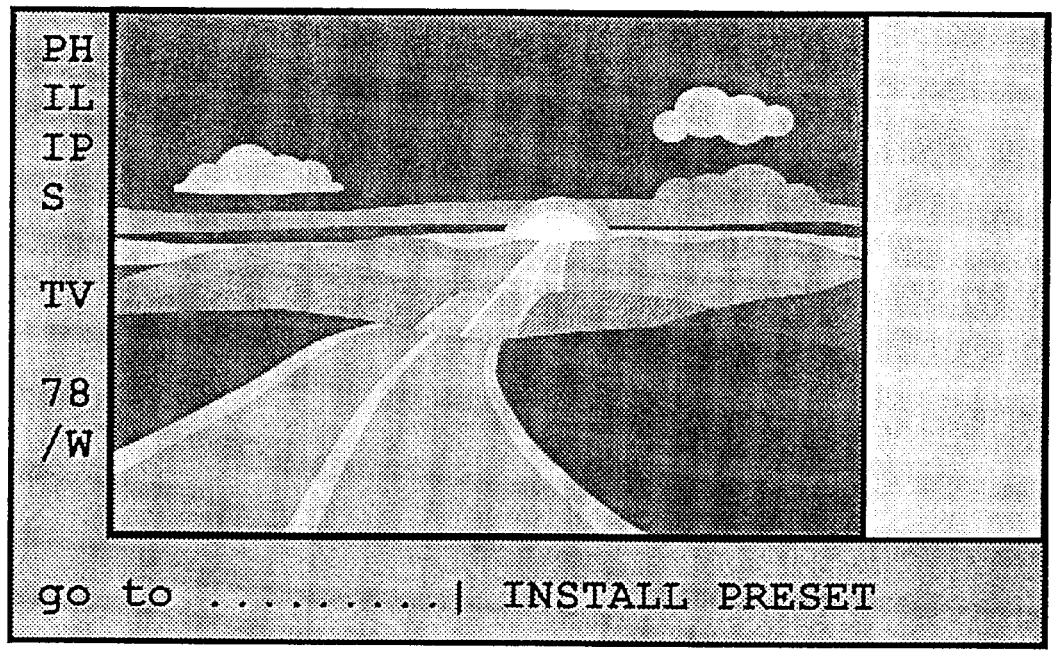
Figure 3C:
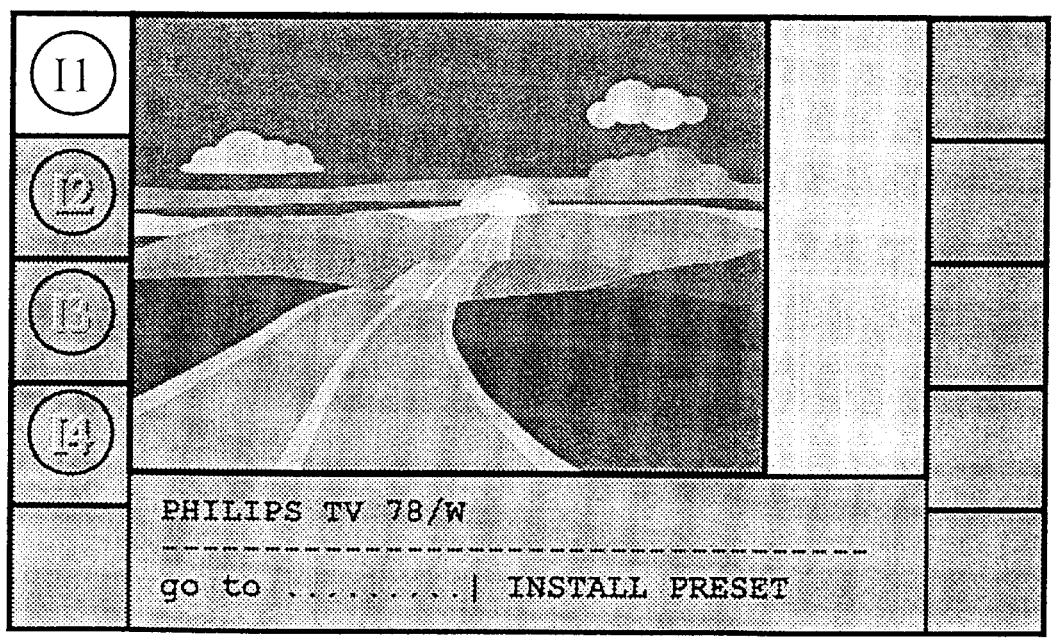

FIGS. 3A–3C show an exemplary root menu image. FIG. 3A shows a first representation type for such root menu for use with a consumer television set. First, the background image is arbitrary. The graphical user interface elements comprise foremost various lines of text, of which one may be selected such as by remote control.

Furthermore, the out-of-display text represented in FIG. 3 describes the same menu as the one in FIG. 3A, including the various possible selections that may be made. FIG. 3B shows a second representation type for the same root menu as in FIG. 3A, wherein however only a single selectable item is displayed. Through scrolling, this item may be exchanged for the various further items listed with respect to FIG. 3A. The representation of FIG. 3 also applies here, just as it does with respect to FIG. 3C. The latter Figure shows a third representation type for the same root menu, wherein the various selectable items are each represented by a respective icon that may be activated immediately. It is clear that user actions, and further pull messages from the user interface controller module can now control the application module in their respective own manners to update the GUI elements. This would influence the information content, such as by jumping between hierarchically organized menu levels, setting parameter values, or altering a mode, such as between mono and stereo audio. The above describes how the User Interface elements will be structured. On the other hand, the particular manner of the rendering proper, such as by highlighting, popping, moving, hiding, discolouring, resizing, scrolling, animating, and a host of further graphical amendations of the rendering, need not be prescribed. This may indeed be effected by the User Interface controller module.

Figures 4, 4A:
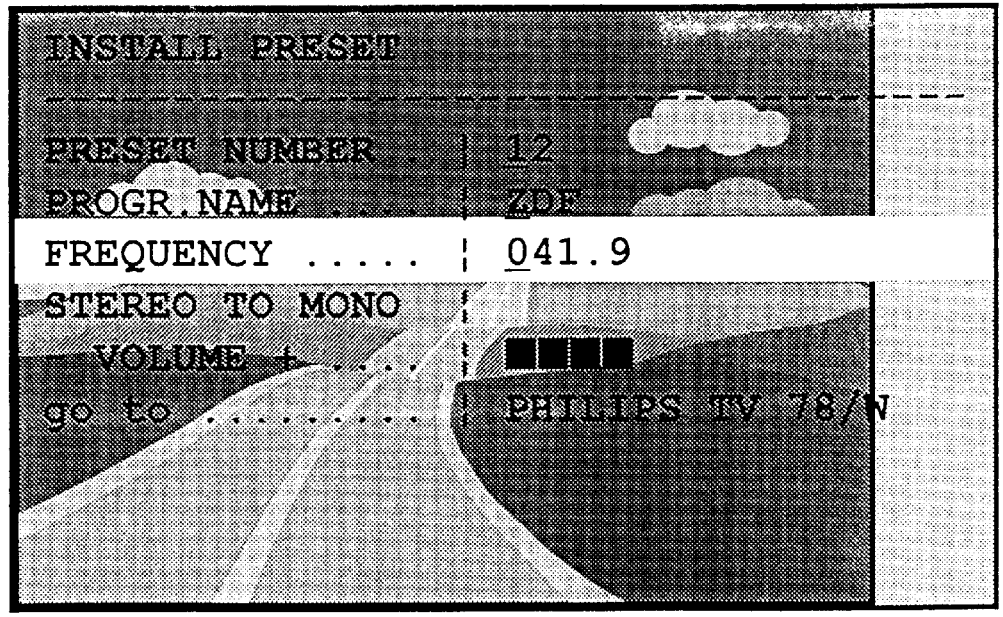
FIGS. 4, 4A–4C, examples of a sub-menu image.
Figure 4B:
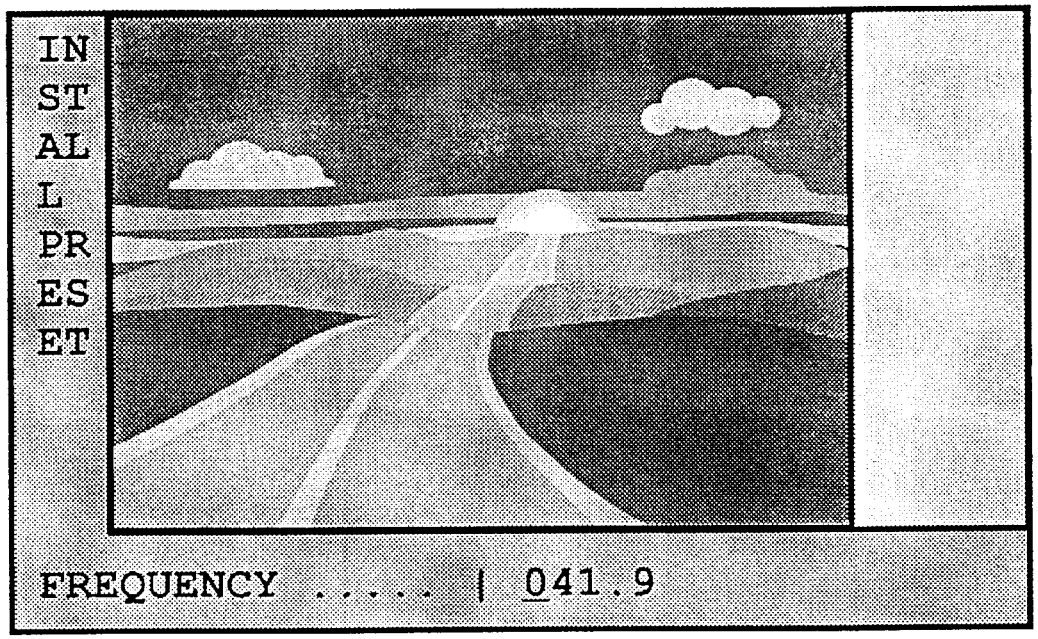
Figure 4C:
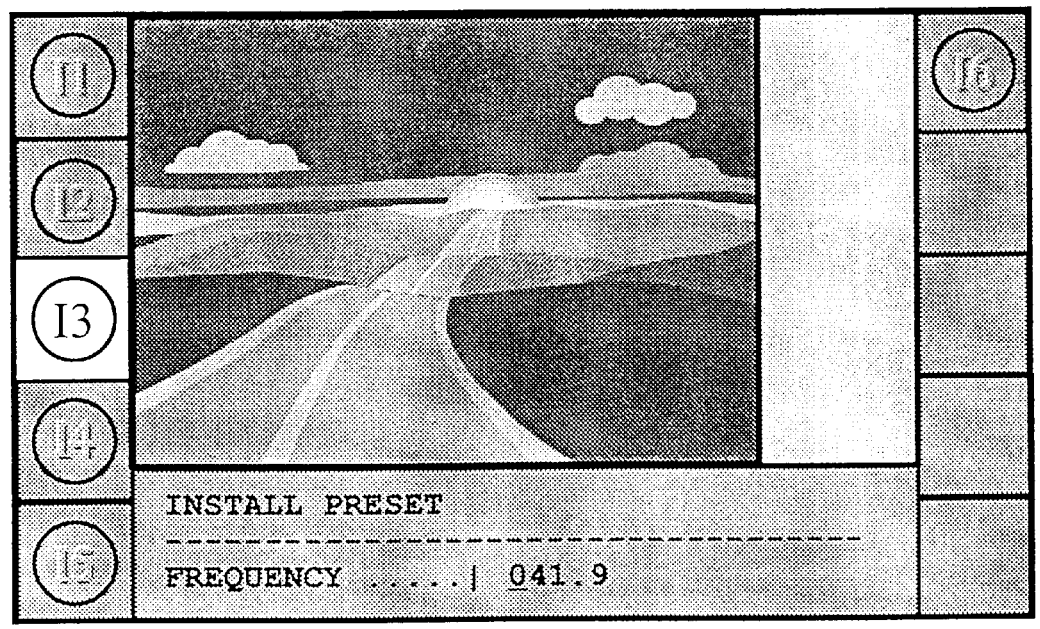

FIGS. 4A–4C show an exemplary sub-menu image, in three representations that respectively correspond to FIGS. 3A–3C. Again, the out-of-display representation of the "install preset" menu has only been given with respect to FIG. 4. According to the invention, changes to a user interface element of FIGS. 3A–3B need in general not be sent to the user interface controller module, when the latter has one of the menus of FIGS. 4A–4C shown. Likewise, changes to a user element of FIGS. 4A–4C need in general not be sent to the user interface controller module, when the latter displays one of the menus of FIGS. 3A–3C. This is so, because the application can keep track of the menu that the user interface controller module is actually rendering. FIGS. 3A–3C, and FIGS. 4A–4C disclose various examples of the variety in structuring that may be displayed. The person skilled in the art know various other set-ups and structuring, both static and dynamic, of such displaying, and will consequence be fully enabled to practice the invention.

The Demand-driven User Interaction Model

The following disclosure deals with (G)UI aspects and the interaction needed to exchange these GUI elements. The basic model for such an interaction protocol describes the GUI information that is exchanged between a target or application module and a user interface controller module, as has been shown also with respect to FIGS. 1 and 2.

In principle, the controller module that "pulls" the GUI info is a UI-controller and the target module that supplies the GUI information is typically a driver for a consumer electronics (CE) apparatus, such as a television set, set top box, tuner, or media player. A more flexible approach is to allow other applications than only a UI-controller to act as controller for pulling GUI info and any application (not only device drivers) to act as target for supplying GUI info.

Target and Controller Interfaces

A target interface may look as follows:
Get-GUI-Element (IN: GE-id, OUT: GE) pulls the requested GUI Element from the target (lines 40+42 in FIG. 2).
  GE-id stands for GUI-element-ID; the GE-id values are determined by the target. For the DDUI protocol these are just identifications for GUI elements.
  GE stands for a description of a GUI-Element. This structure contains the type of the GUI-element and attributes such as size, position, colour, that are relevant for the type in question. The representation of a GUI element on an actual display allows for three levels of "sophistication":
  Rendering the GUI element exactly as described, taking into account all supplied attributes. This requires a UI controller that is capable of dealing with the full DDUI.
  Rendering the intended (graphical) GUI element, but taking into account less than all optional attributes or even no optional attributes at all.
  Rendering the GUI element in a text-only way by making use of the mandatory (text) labels in the attribute list.

The above requires that for a specific GUI element it has been defined which attributes are mandatory and which are optional. The actual GUI-element implies which graphical attributes are mandatory.

Labels should be always mandatory to at least guarantee that "some" rendering is possible on the most "low-end" rendering device that a controller could use.

User-Action (IN: GE-id, UA, OUT: GE-id-List) indicates to the target the User Action actually performed on the specified GUI element. The response from the target indicates which GUI elements have changed due to this user action (lines 44+46 in FIG. 2). A 'scope' definition is needed in order to avoid overloading the controller with changes that it is not interested in, see the Section on Hierarchy and Scope.
  GE-id-List stands for a list of changed GE-id's.
  UA describes a User Action. This structure is defined per type of GUI element. It may contain the type of the corresponding GUI element, and a value that is specific for the type of GUI element, such as a boolean PUSHED/RELEASED for button GUI elements and a character string for text-input GUI elements.
Subscribe-GUI (OUT: GE-id) is a subscribe function that serves two purposes:
  It indicates to the target that this controller is going to use its DDUI protocol, until the controller unsubscribes, see below.
  The controller needs to know the "top-level" GUI-element ID called "root", in order to start the "pulling" process.
Unsubscribe-GUI () indicates to the target that the above subscription has ended. The target will then send no more GUI-Change messages to the User Interface controller module.

A controller interface may look as follows:
GUI-Change (IN: GE-id-List); this message notifies the controller of changes in GUI-elements that were not due to user actions, but for instance due to changes in the device associated with the target, such as end-of-tape (48 in FIG. 2). A 'scope' definition is needed in order to avoid overloading the controller with changes that it is not interested in, see the Section on Hierarchy and Scope.

Hierarchy and Scope

The DDUI protocol requires a hierarchical organization of the GUI elements. This hierarchy serves two purposes:
Allowing a controller to navigate through the GUI elements in an "organized" or hierarchical way.
From a target's point of view it indicates which GUI-elements belong together and should preferably displayed together to a user. Even if the controller cannot or will not display simultaneously all GUI-elements associated to a certain level of the hierarchy, it should be apparent to a user which part of the hierarchy is being actually displayed. This means that the DDUI should distinguish between two types of GUI elements:
"organizational" GUI elements, called "menus" in the sequel;
"non-organizational" GUI elements contained in such menus.
  Note: The "Root" GUI-element mentioned in the Subscribe GUI function of the target should be considered as the "top level" menu.

By means of the above hierarchy, a controller can select menus and also "non-organizational" GUI elements within menus. The way in which a controller navigates through the menus is arbitrary. The only thing that a target may assume is that a user is aware of the menu that is actually being displayed.

The hierarchy is also used by the controller to indicate in which set of GUI elements the controller is interested. The target then uses this information to report to the controller only GUI-element changes pertaining to this set. Of course it is possible that a controller is interested in all changes, but when this is not the case it should not be "overloaded" with changes it is not interested in. The basic scope for reporting the GUI-element change is a single menu. The idea behind this is that a controller is normally only "looking" at one menu at a time. In terms of above hierarchical split-up, this means the following:

If a ("non-organizational") GUI element changes on the current menu this should be indicated by reporting the GUTI-element-ID of that GUTI element.

If the set of "non-organizational" GUI elements on the current menu changes, this should be indicated by reporting the GUI-element-ID of the current menu; this in fact is the menu that was last "pulled" by the controller.

What is claimed is:

1. A software controlled imaging system comprising an application module interconnected to a user interface controller module, and furthermore user interaction means and an imaging subsystem, characterized in that said user interface controller module is arranged for generating a pull request to said application module, the application module arranged for, in a demand driven organization, outputting to the user interface controller module one or more user interface elements indicated in the request, so that the user interface controller module is operative for deciding which GUI elements will be rendered and when and how those GUI elements will be structured.

2. A system as claimed in claim 1, wherein a user action that is notified by the user interface controller module to the application module will result in one or more GUI element changes being sent by the application module to the user interface controller module.

3. A system as claimed in claim 1, wherein furthermore spontaneous updates of one or more GUI elements are notified by the application module to the user interface controller module together with such updated GUI elements.

4. A system as claimed in claim 1, wherein a particular GUI element represents a menu that contains one or more further GUI elements.

5. A system as claimed in claim 4, wherein the application module is being kept aware of one or more actually displayed "active" menus.

6. A system as claimed in claim 5, wherein the user interface controller module receives exclusively amendments of such GUI elements to be made in one or more actually "active" menus.

* * * * *